United States Patent [19]
Clemens

[11] Patent Number: 4,627,532
[45] Date of Patent: Dec. 9, 1986

[54] DIGITAL AUDIO DISK ENCLOSURE

[76] Inventor: Philip M. Clemens, 2424 Forest Park Blvd., Fort Wayne, Ind. 46805

[21] Appl. No.: 709,399

[22] Filed: Mar. 7, 1985

[51] Int. Cl.⁴ ............................................. B65D 85/57
[52] U.S. Cl. .................................. 206/309; 206/312; 206/444; 206/445; 220/350
[58] Field of Search ........................ 206/309, 311-313, 206/445, 444; 220/270, 276, 339, 345-351; 312/8-13

[56] References Cited

U.S. PATENT DOCUMENTS

| D. 174,300 | 3/1955 | Waterman | 220/350 |
| 519,578 | 5/1894 | Hurlbut | 220/350 |
| 3,343,709 | 9/1967 | Henderson | 220/348 |
| 3,481,656 | 12/1969 | Landers | 206/309 |
| 3,622,055 | 11/1971 | Douty | 220/345 |
| 3,744,669 | 7/1973 | Cospen et al. | 220/270 |
| 3,980,178 | 9/1976 | Schidlowski | 206/313 |
| 4,344,545 | 8/1982 | Aschberger et al. | 220/270 |

FOREIGN PATENT DOCUMENTS

| 2936245 | 3/1980 | Fed. Rep. of Germany | 312/9 |
| 0364218 | 8/1906 | France | 220/348 |
| 2271632 | 12/1975 | France | 206/312 |

Primary Examiner—William Price
Assistant Examiner—Jimmy G. Foster
Attorney, Agent, or Firm—Rodger H. Flagg

[57] ABSTRACT

A digital audio disk enclosure is disclosed, having a semi-rigid generally rectangular top and bottom portions, with sided disposed about the periphery of the top and bottom portions to form an enclosed space therebetween. An elongated aperature is disposed through one side, of a size sufficient to pass a digital audio disk therethrough. Guide means are disposed within the enclosed space in aligned spaced relation substantially along the aperature side and one adjoining side. A flexible closure strip is disposed within the guide means, with a tab disposed near one end of the closure strip, suitable to be manually biased between open and closed positions. Ribs, inclined ramps, or guide means extending above top portion and below bottom portion are disclosed for ease of removing the digital audio disk from the enclosure. The digital audio disk enclosure is preferably sized to receive a pamphlet and a digital audio disk within the enclosed space. Top or bottom portions may be transparent or symbols may be disposed upon the enclosure, to identify the contents of the enclosure.

20 Claims, 10 Drawing Figures

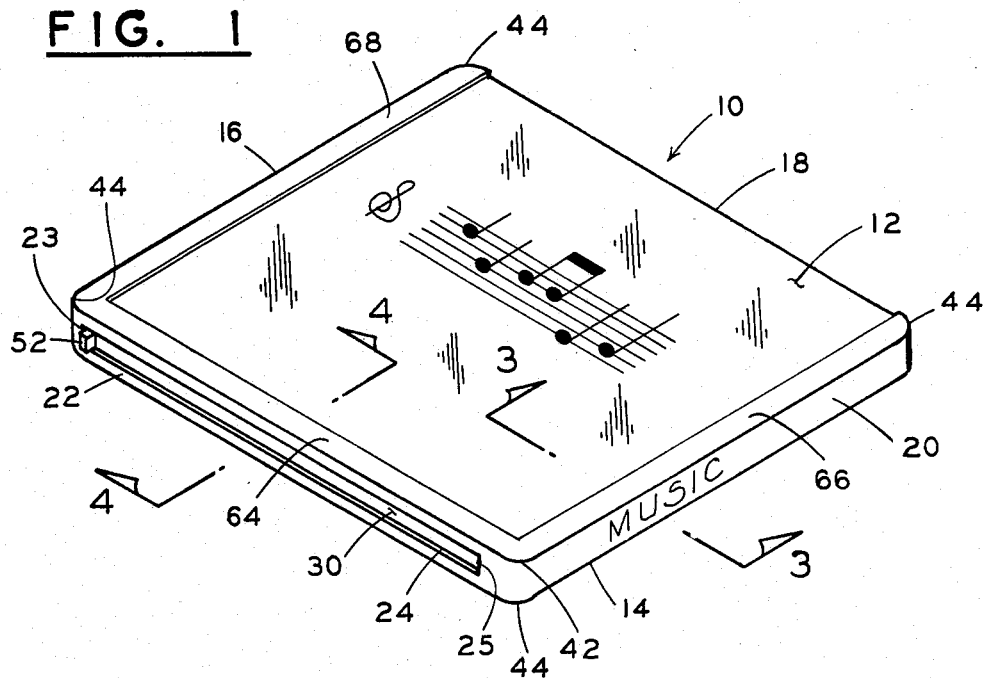
FIG. 1
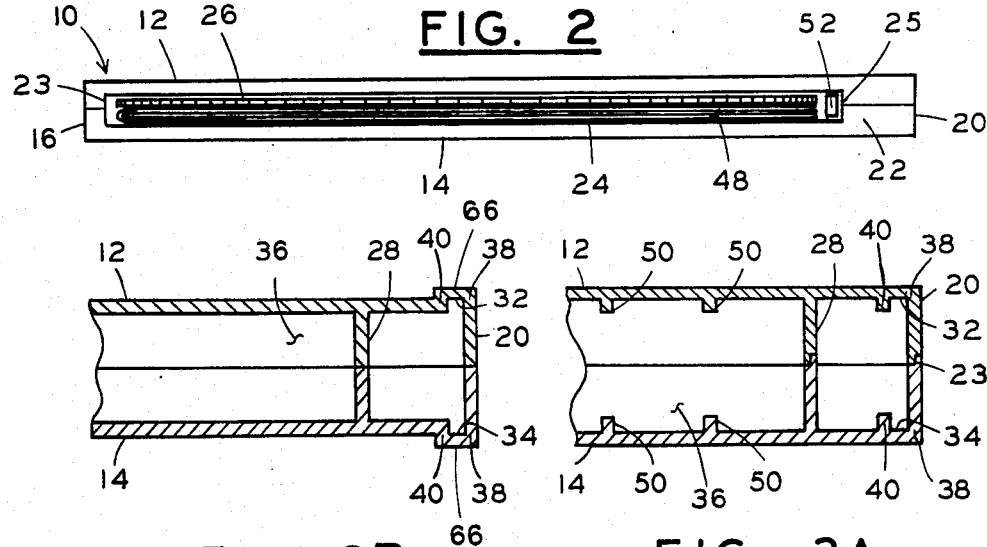
FIG. 2
FIG. 3B
FIG. 3A

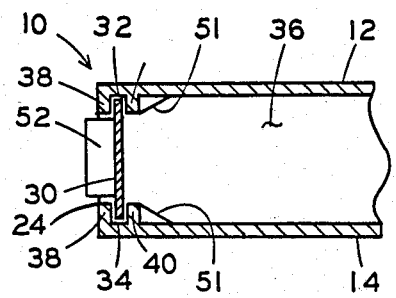
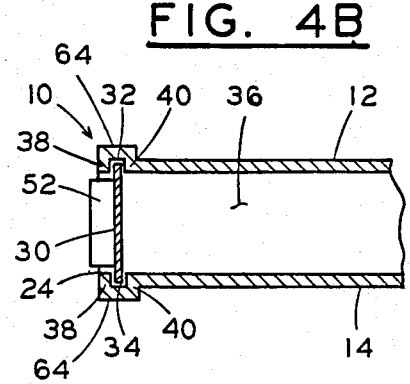
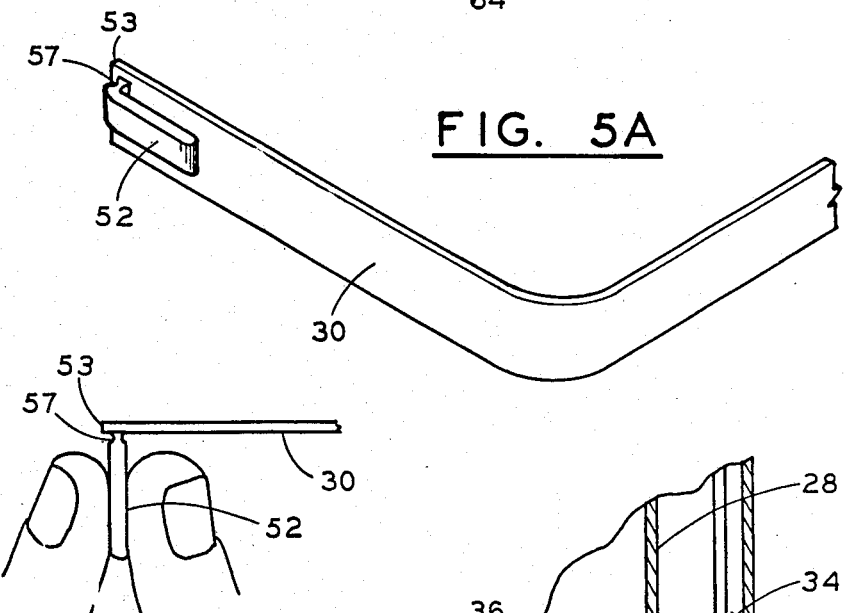
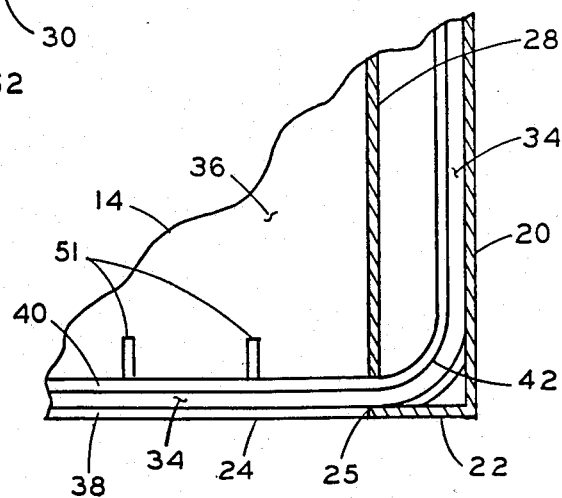

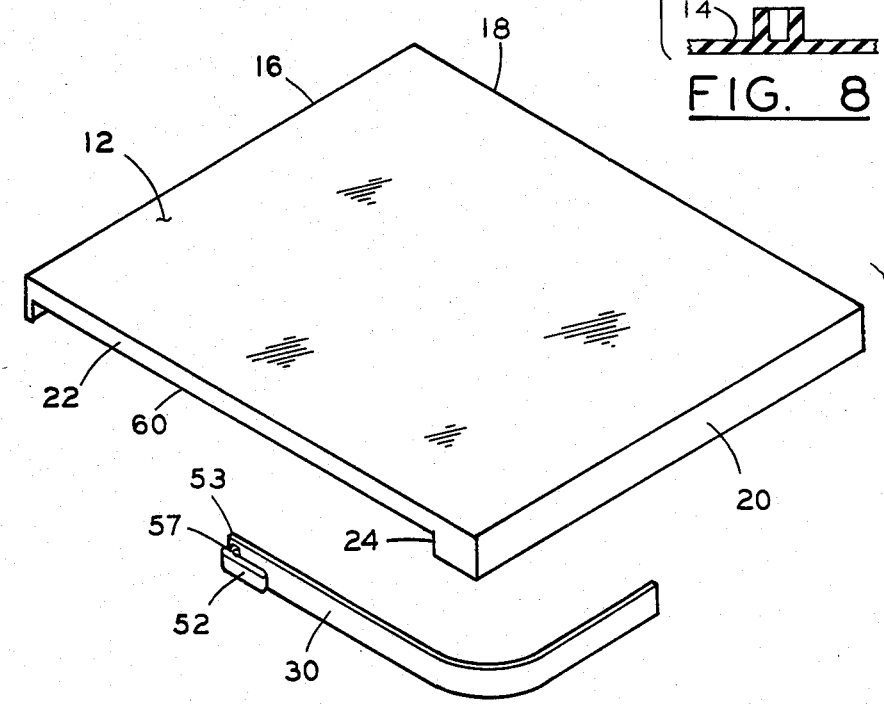
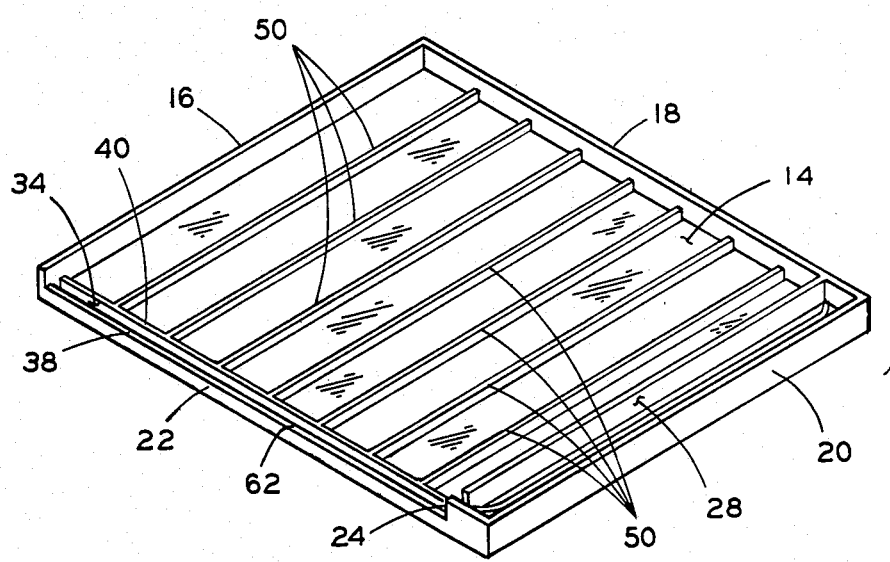

DIGITAL AUDIO DISK ENCLOSURE

BACKGROUND OF THE INVENTION

1. Field of the Invention

This invention relates generally to enclosures; more specifically to enclosures for protecting a digital audio disk during storage or transport.

2. Background of the Invention

Phonograph records have traditionally been kept in open ended cardboard sleeves. Often a protective paper sleeve has been inserted within the cardboard sleeve to increase protection. Due to the greater expense, longer life, and increased capacity of digital audio disks over conventional records, a more substantial enclosure is needed.

Video disks, provided with enclosures such as U.S. Pat. Nos. 4,084,691; 4,084,694; and 4,463,849, are known in the art. These enclosures typically employ removable sleeves to support the video disks as they are inserted or removed form their enclosure. In addition, various means are employed to releasably secure the sleeve within the enclosure.

Efforts to improve the protection of digital audio disks within an enclosure include a hinged spine that opens like a book, such as the enclosure marketed by MCA Records, Universal City, Calif.

A variation of this hinged enclosure, utilizes a second hinged portion in parallel alignment with the first hinged spine. The second hinged portion is selectively hinged to expose a portion of the digital audio disk for ease of handling. Such enclosures are expensive to manufacture, require elaborate tooling, and have openings that allow dust and other particles to enter the digital audio enclosure.

Therefore, what is needed is an attractive, inexpensive enclosure that is easy to manufacture, affords a protective storage environment secure from dust and related particles, and provides an easy means to insert and remove digital audio disks from the enclosure.

Enclosures having a biased closure are knowm, such as U.S. Pat. Nos. 4,351,435; 3,851,734; 1,214,158; 519,578 and U.S. Pat. No. Des. 174,300. Such enclosures are not readily adaptable for storage of digital audio disks. They are relatively expensive to fabricate and do not lend themselves to visual identification of the contents of the enclosure. This is important where the user will have a quantity of such enclosures, and therefore needs a way to quickly identify the contents of each enclosure.

Further, the guide means used to slidably receive the biased closure provides an internal lip within the enclosure that would interfere with the easy removal of a digital audio disk from within such an enclosure.

SUMMARY OF THE INVENTION

The present invention discloses an inexpensive enclosure for storing digital audio disks, that has a closure strip slidably disposed within upper and lower guide means in aligned, spaced relation within the enclosure. When the closure strip is closed, the enclosure is protected from its external environment. As the closure strip is biased into an open position, an aperature is exposed in one side of the enclosure of a size sufficient to receive a digital audio disk therethrough.

Therefore, one subject of this invention is to provide an improved digital audio disk enclosure.

Another object of this invention is to provide an enclosure having a flexible closure strip slidably received within aligned upper and lower guide means extending substantially along the aperature side and extending substantially along one adjoining side.

Another object of the invention is to provide an enclosure sized to receive a digital audio disk and a rectangular pamphlet therein; wherein the pamphlet has an approximate length and width not substantially greater than the diameter of the digital audio disk to be received within the enclosure.

Another object of the invention is to provide visual symbols upon at least one of the top and bottom portions of the enclosure, and to further provide visual symbols upon at least one adjoining side of the enclosure.

Another object of the invention is to provide an enclosure molded of a light transmissive material suitable for providing a visual indication of the contents of the enclosure.

Yet another object of the invention is to provide an improved enclosure embodying any combination of the other objects of the invention.

The above mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a perspective view of an embodiment of the enclosure with the flexible closure strip shown in closed position.

FIG. 2 is an end view of the enclosure showing the aperature side with the closure strip opened to expose a digital audio disk and pamphlet within.

FIG. 3A is an enlarged, partial cross sectional view of the enclosure taken along lines 3—3 in FIG. 1.

FIG. 3B is an enlarged, partial cross sectional view of an alternate embodiment of the enclosure taken along lines 3—3 in FIG. 1.

FIG. 4A is an enlarged, cross sectional view of an embodiment of the guide means taken along lines 4—4 in FIG. 1.

FIG. 4B is an enlarged, cross sectional view of an alternate embodiment of the guide means taken along lines 4—4 in FIG. 1.

FIG. 5A is an enlarged view of the closure strip, with tab means disposed thereon.

FIG. 5B is an enlarged view of the tab means positioned for manual biasing.

FIG. 6 is an exploded view of the component parts of the preferred invention.

FIG. 7 is a partial cross sectional view of the enclosure showing adjoining guide means.

DESCRIPTION OF THE PREFERRED EMBODIMENT

The subject matter which I regard as my invention is particularly pointed out and distinctly claimed in the claims. The structure and operation of my invention, together with further objects and advantages, may be better understood from the following description given in connection with the accompanying drawings, in which:

FIG. 1 shows an embodiment of the digital audio disk enclosure 10, having a generally semi-rigid rectangular top portion 12, a generally semi-rigid rectangular bottom portion 14, with sides 16, 18, 20, 22 adjoining each other and adjoining top and bottom portions 12, 14 about the periphery of the top and bottom portions. Top and bottom portions 12, 14 and sides 16, 18, 20, 22 form an enclosed space 36 of a size suitable for receiving a digital audio disk 26 therein.

An elongated aperature 24, of a size sufficient to receive a digital audio disk 26 therethrough is disposed within side 22. An elongated, flexible closure strip 30 is slidably received within aligned guide means 32, 34 disposed in spaced relation within enclosure 10. Upper guide means 32 is preferably molded substantially along aperature side 22 of top portion 12, and extends along adjoining side 20 of top portion 12. Lower guide means 34 is preferably molded substantially along aperature side 22 of bottom portion 14, and extends in spaced alignment with upper guide means 32 along adjoining side 20 of bottom portion 14.

As shown in FIG. 3A and 4A, the guide means 32, 34 extend in spaced relation between top and bottom portions 12, 14. In this embodiment, ribs 50 are disposed in spaced relation tangent to aperature 24, to aid removal of the digital audio disk 26 from enclosed space 36 through aperature 24. In the embodiment shown in FIG. 3B and 4B, the guide means 32 extend above and below top and bottom portions 12, 14, forming a flush enclosed space 36, for ease of removal of the digital audio disk 26 from enclosed space 36.

As shown in FIGS. 4A, 4B and 7, guide means 32, 34 are disposed in spaced parallel alignment in top and bottom portions 12, 14 to form a contingious guide path extending substantially along aperature side 22 and adjoining side 20 within enclosed space 36. Guide means 32, 34 are preferably molded of uniform cross section with upper and lower outer guide portion 38 in parallel spaced alignment with upper and lower inner guide portion 40, forming guide means 32, 34 therebetween.

The transition of guide means 32, 34 from aperature side 22 to adjoining side 20 preferably traverses an arc 42, whose radius is from four to sixteen times greater than the cross-sectional width of flexible closure strip 30. For example: assuming a cross-sectional width of closure strip 30 as one-thirty second of an inch, the preferred radius of arc 42 will be from one-eighth of an inch to one half inch radius.

Enclosure 10 is a generally rectangular configuration having a preferred corner radius 44 of less than one inch. The preferred cross sectional thickness of the disclosed flexible closure strip is from one-ten thousandth of an inch (0.010) to one-one hundredth of an inch (0.100).

FIG. 2 is an end view of enclosure 10 showing digital audio disk 23 and pamphlet 48 disposed within enclosed area 36. Pamphlet 48 is preferably of rectangular configuration, whose length and width are not substantially greater than the diameter of the digital audio disk 26, and whose thickness does not exceed one-quarter of an inch (0.250), when folded for insertion through aperature 24.

In the embodiment shown in FIG. 3A, ribs 50 may be provided in spaced relation within enclosed area 36, extending tangent to aperature 24. Ribs 50 may extend substantially along the bottom surface of enclosed area 36 and are preferably not higher than the lower edge of aperature 24 when viewed in relation to lower portion 14. Ribs 50 strengthen lower portion 14, while providing support for the contents of enclosure 10 when the enclosure is resting on bottom portion 14. Ribs 50 may also be disposed within enclosed area 36 upon upper portion 12. Where ribs 50 are not used, or where the height of ribs 50 are less than the height of aperature 24 or guide means 32, 34, the contents of enclosure 10 may become caught on that portion of side 22 extending above ribs 50 or above the inner surface of bottom portion 14. This is especially true where guide means 32, 34 extend above and below the inner surface of top or bottom portion 12, 13, as shown in the embodiment shown in FIG. 4A. To avoid catching the contents on side 22 during removal, a pluarity of ramp projections 51 may be disposed in spaced relation between top or bottom portions 12, 14 and aperature 24. Ramp projections 51 urge the contents of enclosure 10 through aperature 24 when enclosure side 22 is tilted downward for ease of removing the contacts from enclosure 10. Ramp projections 51 may be formed as a single continuous ramp, but a plurality of spaced ramp projections are preferred.

As shown in FIG. 6, an elongated flexible closure strip 30 is sized to be slidably received within upper and lower aligned guide means 32, 34. Closure strip 30 has a length and width greater than the length and width of aperature 24, so that when closure strip 30 is closed, end 53 of strip 30 abuts end 23 of aperature 24 and closure strip 30 is sufficiently long to extend past aperature end 25. Thus, closure 10 is effectively sealed to protect the contents from the surrounding environment. When closure strip 30 is closed, as shown in FIG. 1, there are no openings to expose the contents of enclosure 10 to dust, dirt, or similar particles.

As tab 52 is manually biased to the "open" position shown in FIG. 2, flexible closure strip 30 slidably traverses within aligned guide means 32, 34 about radius 42 and substantially along side 20, until tab 52 abuts aperature end 25, thereby stopping further travel. In this position, aperature 24 is opened sufficiently to receive a digital audio disk therethrough.

Tab 52 may be disposed tangent to closure strip 30 with tab 52 positioned externally of enclosed area 36, as shown in FIG. 1, or tab 52 may be preferably molded near end 53 of flexible closure strip 30 as shown in FIG. 5. The portion of tab 52 adjoining closure strip 30 is preferably of a cross-sectional area 57 less than the cross-sectional area of tab 52. The reduced cross-sectional area 57 of tab 52 forms a flexible hinged connection between tab 52 and closure strip 30. The hinged connection allows tab 52 to be sized to be manually grasped in a manner similar to the tab on a zipper, for ease of manually biasing the closure strip 30 between open and closed positions, as shown in FIG. 5B. Tab 52 may be molded in close alignment with closure strip 30 so that tab 52 does not extend substantially beyond the profile of enclosure 10 when tab 52 is in the closed position. Tab 52 may be manually raised from alignment with closure strip 30 to extend beyond the profile of enclosure 10 approximately tangent to closure strip 30 for ease of manually grasping tab 52.

As shown in FIG. 6, side pieces 16, 18, 20, 22 are preferably at least in part formed from one of the top or bottom portions 12, 14. The top and bottom portions 12, 14 are subsequently secured to each other to form an enclosed area 36 therebetween. Top and bottom portions 12, 14 with sides 16, 18, 20, 22 may be secured by spot welding, untrasonic welding, vibration welding, hot plate fusion welding, glueing, heat staking, by use of snap lock pin and sockets, or by other conventional means known to one skilled in this art.

Joined sides 16, 18, 20, 22 may be provided with alignment means 23, such as male and female grooves, notches, bosses, or other conventional means to position top and bottom portions 12, 14 for securement as previously disclosed.

The semi-rigid top and bottom portions 12, 14, when firmly grasped, flex inward to resist movement of digital audio disk through aperature 24, to aid in controllably releasing the digital audio disk from enclosed area 36. This feature aids in insertion and removal of the digital audio disk between the enclosure 10 and the playing apparatus (not shown), while minimizing the need to touch the disk surface with one's hands.

Guide means 32 is preferably molded within the area enclosed by the side of top portion 12 in spaced parallel alignment. Guide means 34 is preferably molded to the enclosed side of bottom portion 14 in spaced parallel alignment as previously disclosed. Upon assembly of top and bottom portions 12, 14, top and bottom guide means 32, 34 form an aligned guide means disposed substantially along aperature side 22, and extending substantially along adjoining side 20 in a manner to form a contiguous aligned guide means within enclosure 10.

Flexible closure strip 30 is preferably assembled within the aligned guide means 32, 34 with tab 52 positioned within aperature 24 to extend externally of enclosed area 36, prior to securing top and bottom portions 12, 14 together.

Where top and bottom portions 12, 14 are molded with adjoining side 16, 18, 20, 22 integrally formed as shown in FIG. 6, aperature 24 may be formed by providing a relieved area 60 extending through depending side 22 top portion, and an aligned relieved area 60 extending through depending side 22 bottom portion. When top and bottom portions 12, 14 are secured together, the relieved areas align to form aperature 24 in side 22.

As shown in FIG. 3A, 3B 6 and 7, an internal wall 28 is preferably located in spaced relation from side 20, and extends from top portion 12 to bottom portion 14. Internal wall 28 keeps the contents of enclosed area 36 from entering the offset area used for the adjoining guide means 32, 34. Internal wall 28 extends substantially along side 20, but does not extend past guide means 32, 34 as this would interfere with the biasing movement of closure strip 30 within guide means 32, 34.

As shown in FIGS. 1, 2, 6 and 7, aperature 24 is preferably offset in side 22, an amount sufficient to clear radius 42, so that when closure strip 30 is biased to open position shown in FIG. 2, the contents of enclosed area 36 may pass through aperature 24 without catching on closure strip 30 end 53.

The embodiment shown in FIG. 1, 3B and 4B provides a raised ridge are 64, 66 in the area of internal guide means 32, 34. This raised ridge 64, 66 allows the internal top and bottom surfaces to be flush with internal 40 and external sides 38 of guide means 32, 34, for ease of removal of contents from enclosed area 36 through aperature 24. A raised ridge area 68 may be used to provide a uniform stacking surface 64, 66, 68, and to provide protection for symbols disposed between raised ridge areas 64, 66, 68 on top and bottom portions 12, 14.

The assembled enclosure 10 may be fabricated of light transmissive material, as previously disclosed, or visual symbols such as writing or pictures may be disposed upon at least one of the top and bottom portions 12, 14 and upon at least one of the sides 16, 18, 20, 22. Symbols disposed upon enclosure 10 may be in the form of printed material, and may be secured in place or removably disposed. Such symbols are useful to identify the product within the enclosure, as well as to promote the sale of the product within the enclosure. The symbols may be printed directly upon at least one of the top and bottom portions, and at least one side, or the symbols may be printed upn a suitable surface and the surface in turn secured or removably disposed upon the digital audio disk enclosure. Where the digital audio disk enclosure is transparent, the printed surface may be disposed within enclosed space 36.

The disclosed enclosure 10 is a compact, economical enclosure that it easy to manufacture, provides suitable protection to a digital audio disk stored within, and is preferably made with top and bottom portions having depending sides, and a movable closure strip slidably received between aligned guide means molded within enclosure 10.

INDUSTRIAL APPLICABILITY

The digital audio disk enclosure of the present invention is used to store and transport digital audio disks.

Therefore, while the invention has been described with reference to a particular embodiment, it is to be understood that modification may be made without departing from the spirit of the invention or from the scope of the following claims.

I claim:

1. An enclosure for protecting a digital audio disk, which comprises:
   (a) a semi-rigid, generally rectangular top portion with four depending sides;
   (b) a generally rectangular bottom portion with four depending sides sized to align with the four depending sides of said top portion;
   (c) a means to secure said top portion to said bottom portion to form an enclosed area sized to receive a digital audio disk therebetween;
   (d) a first relief extending through one of said depending sides of said top portion, and a second relief extending through one of said depending sides of said bottom portion, said first and second reliefs aligned to form an elongated aperature through one said side when said sides are secured by said means to secure said four depending sides; said aperature sized to receive a digital audio disk therethrough;
   (e) a guide means disposed upon said bottom portion in spaced parallel alignment substantially along said aperature side and substantially along one adjoining side, said guide means disposed upon said bottom portion in spaced alignment with a guide means disposed upon said top portion, when said top and bottom portions are secured together in a manner to form a contiguous aligned guide means within said enclosure;
   (g) a flexible closure strip sized to be slidably received within said aligned guide means, said closure strip of a length and width sufficient to enclose said aperature;
   (h) a tab means disposed near one end of said closure strip, said tab means disposed upon said closure strip externally of said enclosed area to provide means to manually bias said tab means between open and closed positions within said aperature, said open position exposing an opening through said aperature sufficient to pass a digital audio disk therethrough.

2. The apparatus of claim 1, wherein the sides of the top and bottom portions are secured by ultrasonic welding to form an enclosed space therebetween.

3. The enclosure of claim 1, wherein the sides of the top and bottom portions are secured by heat staking to form an enclosed space therebetween.

4. The enclosure of claim 1, wherein the sides of the top and bottom portions are secured by snap lock and socket fastener to form an enclosed space therebetween.

5. A digital audio disk enclosure, which comprises:
(a) a semi-rigid, generally rectangular top portion;
(b) a semi-rigid, generally rectangular bottom portion substantially the size of the top portion;
(c) four side portions adjoining said top and bottom portions about the periphery of said top and bottom portions, forming an enclosed area between said sides, said top portion and said bottom portion, said enclosed area sized to compactly receive a digital audio disk therein;
(d) an elongated aperature disposed through one of said side portions, said aperature of a size sufficient to pass a digital audio disk therethrough;
(e) an aligned top and bottom guide means extending above and below said aperature in spaced relation, said guide means extending beyond said aperature substantially along one adjoining side portion within said spaced enclosure;
(f) a single elongated flexible closure strip sized to be slidably received within said aligned guide means, said closure strip of a size greater than the length and width of said aperature;
(g) a single tab means disposed near one end of said closure strip, said tab means sized to extend externally of said enclosed area for manually biasing said closure strip to selectively expose and enclose a portion of said aperature, said exposed portion of said aperature of a size sufficient to pass a digital audio disk therethrough,
wherein at least one of the semi-rigid top and bottom portions are adapted to flex inward when firmly grasped, to aid in controllably releasing the digital audio disk from the enclosed area.

6. The enclosure of claim 5, wherein the spaced enclosure is sized to receive a pamphlet in addition to said digital audio disk; said pamphlet of a rectangular configuration, whose length and width are not substantially greater than the diameter of said digital audio disk.

7. The enclosure of claim 5, wherein a plurality of ribs are disposed in spaced relation within said enclosure tangent to said aperature side, said ribs sized to extend substantially along said bottom portion of said enclosure to support the contents of the enclosure thereon.

8. The enclosure of claim 5, wherein a plurality of inclined ramp projections extend in spaced relation within said enclosure tangent to said aperature side and extending from said bottom portion of said enclosed area to said aperature opening to urge the contents of said enclosure through said aperature when said aperature is tilted downward for ease of removing contents from said enclosure.

9. The tab means of claim 5, wherein a portion of said tab means extending externally of said enclosure is disposed tangent to the adjoining portion of said flexible closure strip.

10. The tab means of claim 5, wherein said tab means is molded adjacent to one end of said flexible closure strip, the portion of said tab means adjoining said closure strip being a cross sectional area less than the cross sectional area of said tab means to form a flexible hinged connection therebetween, said tab means of a size to be manually biased between open and closed positions to selective expose and enclose the contents of the enclosure through said aperature.

11. The enclosure of claim 5, wherein the top portion is molded of a light transmissive material to provide a visual indication of the contents within the enclosure, when viewed through the top portion.

12. The enclosure of claim 5, wherein the bottom portion is molded of a light transmissive material to provide a visual indication of the contents within the enclosure, when viewed through the bottom portion.

13. The enclosure of claim 5, wherein visual symbols are disposed upon at least one of said top and bottom portions, and upon at least one side portion.

14. The aligned guide means of claim 5, wherein the transition of said guide means from said aperature side to said adjoining side traverses an arc whose radius is from four to sixteen times greater than the cross sectional width of the flexible closure strip.

15. The enclosure of claim 5, wherein said side pieces are at least in part formed from at least one of said top and bottom portions, and said top and bottom portions are subsequently secured to each other in spaced relation to form said enclosed area therebetween.

16. The enclosure of claim 5, wherein the flexible closure strip is assembled within at least one of said aligned top and bottom guide means prior to securing said top and bottom portions to each other.

17. The enclosure of claim 5, wherein said aligned top and bottom guide means are formed to partially extend from said top and bottom portions in parallel spaced relation of uniform cross section, to slidably receive said flexible closure strip therebetween.

18. The enclosure of claim 5, wherein the four corners of the generally rectangular top and bottom portions have rounded corners defined by an arc whose radius is less than one inch.

19. The enclosure of claim 5, wherein the cross sectional area of the flexible strip is from one-ten thousandth of an inch to one hundredth of an inch in cross sectional width.

20. The digital audio disk enclosure of claim 5, wherein the guide means is raised above said top portion and below said bottom portion, in a manner to provide an enclosed area flush with said aperature opening for ease of removal of said digital audio disk from said enclosed area.

* * * * *